Sept. 14, 1965 R. M. GOLD 3,206,601
PLASTIC FILM THERMOGRAPHY
Filed July 31, 1963

INVENTOR.
ROBERT M. GOLD

ATTORNEY

United States Patent Office 3,206,601
Patented Sept. 14, 1965

3,206,601
PLASTIC FILM THERMOGRAPHY
Robert M. Gold, Brooklyn, N.Y., assignor to Keuffel &
Esser Company, Hoboken, N.J., a corporation of New
Jersey
Filed July 31, 1963, Ser. No. 298,932
24 Claims. (Cl. 250—65)

This application is a continuation-in-part of application Serial No. 282,043, filed May 21, 1963.

This present invention relates to the formation and development of images and more particularly refers to the formation and development of images on layers of thermoplastic resin by means of heat.

Printing on surfaces of thermoplastic resins previously required pretreatment by flame, high-voltage electrical discharge, or strong oxidizing solutions to make the surface ink or dye receptive. These pretreatments required cumbersome and expensive equipment and were necessarily carried out shortly before printing in order to realize the greatest benefit.

Documents such as engineering drawings having low contrast between image areas and non-image areas previously required tedious re-tracing or inking of the image to increase the contrast for purposes of reproduction. High contrast was especially required to microfilm the drawings. This requirement was more stringent when the microfilm was used to make microfilm copies and subsequent enlargements. The present invention provides methods and means for increasing the contrast of masters not suitable for reproduction or microfilming without expensive, error-prone, and tedious re-tracing or inking of image areas.

One well-known method of making reproductions is the thermosensitive reflex copying method, but copies produced by this method have not been entirely satisfactory because of retained heat sensitivity. The present invention provides materials, methods, and means for reproducing documents by thermosensitive copying methods to produce a copy which is not affected by further heat.

One object of the present invention is to provide methods and materials for treating a layer of thermoplastic resin with heat for the production, reproduction, and intensification of graphic intelligence thereon.

Another object is to provide materials, methods, and means for forming and developing images in layers of thermoplastic resin by means of heat.

Another object is to provide a method of printing on a layer of thermoplastic resin without expensive pretreatment thereof to make the surface of the layer receptive to ink or dye.

Another object is to provide a method of intensifying the contrast of documents in a rapid, error-free, and inexpensive manner, thereby making the documents suitable for reproduction and microfilming.

Another object is to provide a method of copying a document by means of heat, and coloring matter, the copy being stable to further application of heat.

Another object is to provide a method of forming latent images in a layer of thermoplastic resin, which latent image can be developed at a later time.

Another object is to provide methods for developing latent images to make them visible without electrostatic charging of the layer.

Another object is to provide a method of making changes in graphic intelligence during the process of reproducing a document.

Another object is to provide materials bearing latent images which can be developed to form positive or negative images.

Other objects of the present invention will become apparent during the course of the following specification.

The objects of the present invention are realized by the selective application of heat in blanketwise or imagewise fashion. Thus, a thermoplastic resin may be: (1) heated uniformly, then colored imagewise; (2) heated imagewise, then colored; or (3) colored uniformly, then heated imagewise and washed. Many variations are possible. For example, the source of heat can be a warm body or infrared radiation and the coloring matter can be applied as a powder, solution, or layer.

In the heating step, the thermoplastic resin is exposed to temperatures at least equal to the second order transition point of the resin or to that temperature which will effect changes in the absorptivity of coloring matter such as a dye. Thus dye already present on a heated layer or dye applied after heating will be selectively absorbed in the heated areas and so form a permanent visible image.

Several methods of printing are possible by means of the present invention. One method comprises the steps of heating a layer of thermoplastic resin to a temperature which affects the dye acceptance of the layer and applying dye imagewise such as with a stamp. Another method comprises heating a layer of thermoplastic resin uniformly to a temperature which affects the dye acceptance of the layer and applying coloring matter by means of a dye carrier sheet and a raised image stamp such as a typewriter key.

Dye can also be applied from a heated stamp so that the image areas become heated and colored simultaneously. A dye carrier sheet can also be used with a heated stamp to form permanent images on the layer of thermoplastic resin.

Figure 1:
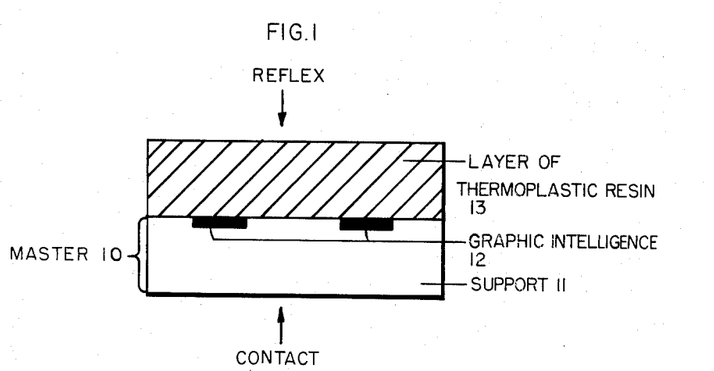
FIGURE 1 illustrates one arrangement of a master in heat-conductive relation with a layer of thermoplastic resin for exposure to infrared radiation by either the reflex method or the contact method.

Graphic intelligence 12 on a suitable master can be reproduced by providing a layer of thermoplastic resin 13 in heat-conductive relation to the master 10 (as in FIGURE 1) exposing the master and layer to infrared radiation to form in the layer a heat-created latent image corresponding to the master image and developing the latent image with coloring matter which selectively adheres to the layer. A typical master comprises a support 11 substantially transparent to infrared radiation with infrared radiation-absorbing marking material disposed imagewise on the support. The layer of thermoplastic resin is preferably supported on a transparent base.

Intensification of graphic intelligence can be accomplished in accordance with the present invention by providing a layer of thermoplastic resin in heat-conductive relation to graphic intelligence, exposing the layer and graphic intelligence to infrared radiation to form in the layer a heat-created latent image corresponding to the graphic intelligence, and developing the latent image to produce a visible image coincident with the graphic intelligence, thereby intensifying the graphic intelligence.

The layer of thermoplastic resin can be either self-supporting or supported on a base. It can contain pigments for pencil-take or color. In addition the supporting base can be coated on the other side with another layer of thermoplastic resin, pencil-take layer or photographic emulsion. The supporting base can be opaque or visually transparent but it must be substantially transparent to heat rays.

It is obvious that many arrangements of the layer and master are possible. The layer may be under the graphic intelligence or over it. It can be on either side of the master support if the support is visually transparent, actinically transparent, and heat-conductive. Both sides of a master may be coated with a layer of thermoplastic resin. The layer or layers must be in heat-conductive relation to the master image.

Figure 2:
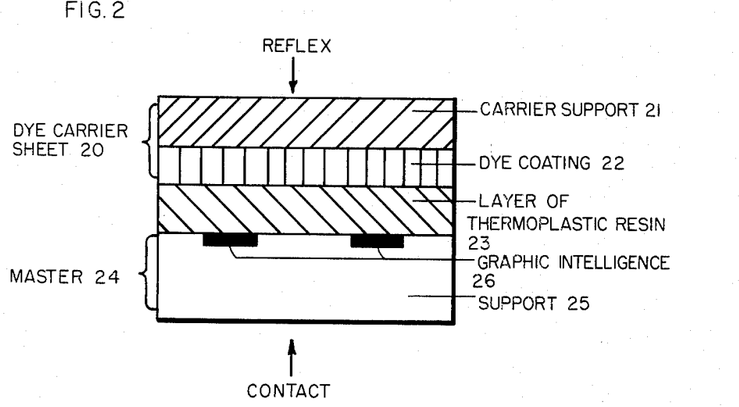
FIGURE 2 is a sectional view of a dye carrier sheet having its dye coating in contact with a layer of thermoplastic resin disposed in heat-conductive relation to a master for exposure by contact or reflex technique.

In another embodiment (FIGURE 2) of the present invention, a layer of thermoplastic resin 23 is placed in heat-conductive relation to a suitable master 24, and a dye carrier sheet 20 is placed in heat-conductive relation to the layer. The dye carrier sheet comprises a carrier support 21 and a transferable dye coating 22 thereon. Exposure of the assembly to infrared radiation by either the reflex or contact method with moderate pressure forms a heat-created latent image and develops it by dye transfer from the dye carrier sheet of the layer. Various other combinations of master, layer, and dye carrier sheet are suitable for the present invention.

The dye carrier sheet is substantially transparent to infrared radiation and the carrier support is preferably heat-conductive. Suitable dye carrier supports comprise cellophane, polyethylene terephthalate, and cellulose acetate.

The layer may contact the master in either the face-to-face arrangement or it may contact the master in a face-to-back arrangement.

Development of the layer exposed face-to-face contact produces an image which is laterally reversed when viewed from the contact surface side and right-reading when viewed through the layer. Development of the layer exposed in face-to-back contact produces a right-reading image on the side contacting the master when viewed from the contact side and laterally reversed when viewed from the non-contact side.

The images are positive or negative depending upon the method of development and the materials used.

Relief images can be formed on a supported layer of thermoplastic resin. One method comprises the steps of: forming a heat-created latent image in a supported layer of thermoplastic resin; and etching out the latent image areas down to the support with a suitable solvent to produce a negative relief image in the supported layer.

The latent images formed by the present invention are relatively permanent (referred to as permanent herein) and are developable without the application of electrostatic charges to the layer. Suitable developing materials adhere selectively to the latent image-bearing layer to render the image visible. The latent image is normally invisible but it can be viewed when the layer is placed between crossed optical polarizers.

Materials suitable for the layer are thermoplastic resins having the property of being sufficiently heat-affected by a temperature difference of about 15° C. or less to form latent image areas and non-latent image areas which can be developed. Such resins are polyethylene, nylon, cellulose acetate butyrate, cellulose acetate, polyvinyl butyral, polyvinyl chloride, polyvinyl acetate copolymers, plasticized nitrocellulose and the like. It is believed that the resin must be in a relatively plasticized or disordered state to be suitable for the present invention. Polyethylene prepared by applying molten resin at about 600° F. to a base such as glassine and rapidly cooling the coated layer was found to be suitable. The thickness of the layer was 0.5 to 2 mils.

Suitable supports for the layer of thermoplastic resin are paper, glassine, polyethylene terephthalate, vinyl polymers, and other supports substantially transparent to infrared radiation.

Contact exposure is defined for this specification as irradiation of a master layer assembly from the master side. Reflex exposure is defined as irradiation of the assembly from the layer side.

Heating by conversion of infrared radiation in the graphic intelligance image areas is extremely rapid in the present case and it is believed that there is little loss in scattering of the heat. This results in a clearly defined developed image on the copy layer.

Development of the layer of thermoplastic resin having the heat-created latent image is accomplished by utilizing the difference in certain properties between the latent image areas and the non-latent image areas of the layer. These differences are:

(1) permeability of a liquid with or without a dye;
(2) absorption or adsorption of solids;
(3) resistance of abrasion;
(4) solubility in solvents;
(5) birefringence when placed between crossed optical polarizers and viewed by transmitted light;
(6) wettability by liquids which may contain a chemically reactive compound; and
(7) removal of dissolved or dispersed dye.

Development of the latent image into visible images is accomplished by treatment of the layer of thermoplastic resin by:

(1) applying a dye in a solvent;
(2) applying solid dye in powder form or from a dye coating on a dye carrier sheet;
(3) rubbing with an abrasive such as steel wool;
(4) dissolving (etching) away image areas to leave a relief pattern;
(5) viewing the layer placed between crossed optical polarizers by transmitted light;
(6) applying a selected liquid containing a reactive chemical and subsequently treating with another chemical; or
(7) removing dye initially present in the layer from selected image or non-image areas with a solvent.

Various modifications of these methods can be made within the scope of the invention.

A layer of polyethylene may be printed with a graphic intelligence without prior treatment thereof by applying a dye solution to a heated raised type pattern such as a stamp or printing roller and applying the dye-bearing heated raised type pattern to the layer against a backing means to form a heat-created latent image in the layer and to simultaneously transfer dye to the latent image where it is fixed permanently by permeation into the image areas of the layer. This method permits high speed printing and multicolor printing without any pretreatment to make the layer ink or dye receptive. It is a convenient method of making single or multicolor transparencies.

Instead of using a dye solution to develop the latent image formed by the heated raised type pattern, a dye carrier sheet comprising a heat-conductive support and a dye coating thereon may be used. The dye carrier sheet is superposed on the layer to form a sandwich with the dye coating in contact with the layer. A heated raised type pattern such as a stamp or printing roller is then applied to the sandwich against a backing means to form a latent image in the layer and to simultaneously transfer dye to the latent image where it is fixed permanently by permeation into the latent image areas of the layer.

The use of different colored dyes in the dye carrier sheets permits multicolor printing. Printing with transparent dyes on a clear layer of thermoplastic resin produces a transparency for projection purposes. A negative image is produced in the dye carrier sheet.

The dye carrier sheet may be separably laminated to a layer of thermoplastic resin for handling ease. After the application of the heated raised type pattern, the layer can be de-laminated by peeling apart the layer and the sheet. A further modification is to apply the dye with a binder such as plasticized polyvinyl chloride to the layer as a peelable coating. Excellent surface contact is afforded by this modification. The peelable coating is removed from the layer after application of the heat image.

Some of the dyes found suitable for the present invention are:

| | |
|---|---|
| Oil Red O | CI 26125. |
| Oil Brown M | CI Solvent Brown 21. |
| Plasto Blue RDA | CI Solvent Blue 16. |
| Plasto Violet MR | CI Solvent Violet 17. |
| Oil Blue A | CI Solvent Blue. |
| Calcozine Violet | CI 42535. |
| Methyl Violet Base | CI 42535 B. |
| Oil Brown Y | CI 20020. |
| Quinizarine Green Base | CI 61565. |
| Brilliant Oil Blue BMA | CI Solvent Blue 16. |
| Azo Oil Blue Black | CI Solvent Black 12. |
| Brilliant Oil Scarlet GG | CI Solvent Orange 7. |
| Azo Oil Black | CI Solvent Black 12. |
| Oil Red EGN | CI 26120. |
| Azosol Fast Red BR | CI 12715. |
| Blue B Base | CI 61505. |
| Yellow G Base | CI 11855. |
| Rhodamine B | CI 45170. |
| Oil Red | CI Solvent Red 24. |
| Oil Red RO | CI Solvent Red 63. |
| Methylene Green | CI 52020. |

The present invention is further illustrated by the following examples which are not intended to limit the scope of the present invention:

*Examples*

(1) A heat pattern was applied to a layer of polyethylene by means of a heated stylus to form a developable latent image in the layer. Heated metal stamps and type keys at about 140° F. to about 180° F. were suitable. The latent images were developed by applying a dye solution which adhered to and permeated the latent image areas but did not appreciably adhere to or permeate the non-image areas. A positive image was formed. A suitable dye solution was 5% Oil Black (CI Solvent Black 12) in xylene. Applying a 1% solution of Oil Red O dye (CI 26125) in xylene followed by a wash solvent mixture of 1 to 1 carbon tetrachloride and isopropyl alcohol also developed the latent images and removed the dye from the non-image areas. The application of different colored dye solutions to different latent images on the same layer produced multicolor prints. The latent images were developable for many months after they were formed in the layer.

(2) A heated stamp was coated with a dye solution and then applied to a layer of thermoplastic resin to simultaneously form and develop a latent image therein. A visible positive image was produced. A suitable dye solution was 5% Oil Black dye (CI Solvent Black 12) in xylene for use on a layer of polyethylene.

(3) A dye carrier sheet comprising a cellophane support and a dye coating of Oil Red O dye (CI 26125) on the support was used instead of the dye solution of Example 2. The sheet was placed in contact with the layer of polyethylene with the dye coating contacting the layer. The sandwich was then impressed with a heated stamp to simultaneously form and develop a latent image in the layer.

(4) A 0.5 mil layer of polyethylene was extruded onto a support of super-calendered bleached kraft paper to form a laminate. Graphic intelligence in the form of pencil lines was drawn on the paper. Contrast between the graphic intelligence and the background was improved for purposes of reproduction and microfilming by exposing the laminate to infrared radiation in a Thermo-Fax machine to form in the polyethylene a heat-created latent image corresponding to the pencil line image on the paper. The latent image was developed by applying a 1% solution of Oil Red O (CI 26125) in toluene to the polyethylene, evaporating the solvent, and washing with a 1 to 1 mixture of carbon tetrachloride and isopropyl alcohol to produce a positive red dye image coincident with the pencil lines. The dye image intensified the pencil lines sufficiently to permit good reproductions and microfilms to be made by the diazotype process and by silver halide processes.

(5) A photographic emulsion was coated on one side of a support transparent to visible and infrared radiation and on the other side with a layer of cellulose acetate butyrate with a pencil surface. A photographic image was made and developed in the photographic emulsion. The support was then exposed to infrared radiation to form a developable heat-created latent image in the cellulose acetate butyrate. The latent image was developed with a dilute solution of Azosol Fast Red BE (CI 12715) in ethyl alcohol and washed with clean ethyl alcohol. The developed image coincided with the photographic image and thus intensified it. Pencil line additions were made before and after the photographic image was intensified.

(6) Layers of thermoplastic resin having a pencil surface were used to intensify pencil lines drawn on the pencil surface. The layers were first exposed to infrared radiations to form a heat-created developable latent image corresponding to the pencil lines. Development of the latent image with a dye solution formed a visible image which added to the overall density of the pencil lines. The intensified pencil lines were more suitable for reproduction purposes.

Development was accomplished on a cellulose acetate layer by using a dye solution-wash solvent combination as in Example 1. Good results were also obtained with 1% Oil Red O dye (CI 26125) in toluene followed by a 1 to 1 wash solvent mixture of carbon tetrachloride and isopropyl alcohol or with 10% Azosol Fast Red BE dye (CI Solvent Red 8) in ethyl alcohol followed by clean ethyl alcohol as a wash solvent.

(7) A pigmented layer of cellulose acetate butyrate was coated on a polyethylene terephthalate support. The layer served as a drawing surface but pencil lines drawn on the surface lacked sufficient contrast to make good reproductions and microfilms. The pencil drawing was exposed to infrared radiation to form a heat-created latent image in the layer coincident with the pencil drawing. The layer was then treated with a 10% solution of Azosol Fast Red BE (CI Solvent Red 8) in ethyl alcohol and washed with isopropyl alcohol. The latent image areas were dyed an intense red. The dye image coincided with the pencil image to increase the contrast for photocopying purposes.

Another suitable dye solution was a 1% solution of Oil Red O dye (CI 26125) in ethyl alcohol. Clean ethyl alcohol was used as the wash solvent.

(8) On layers of thermoplastic resin comprising a pigment for pencil-take, pencil lines were drawn. Exposure to infrared radiation produced heat-created latent images in the layers. These latent images were etched out with isopropyl alcohol to produce a negative relief image suitable for use as a printing plate. Cellulose acetate butyrate and nitrocellulose were suitable layer materials.

(9) A pencil drawing on a base transparent to infrared radiation was coated with a layer of thermoplastic resin in one of three ways: front side only, back side only, and both sides. Exposure to infrared radiations produced in the layer a heat-created latent image which was developed with dye as in the previous examples to produce a dye image which intensified the original pencil drawing image. Suitable thermoplastic resins for the coatings were polyethylene, nylon, cellulose acetate butyrate, cellulose acetate, and polyvinyl butyral. The intensified drawings were suitable for reproduction purposes.

(10) A drawing with weak and unwanted lines was used to make a copy suitable for microfilming. A copy layer of thermoplastic resin with a pencil surface was placed in heat-conductive relation to the drawing. Portions of the drawing to be changed were shielded from infrared radiation by a metal foil. Exposure of the partially shielded drawing and copy layer to infrared radiation produced a heat-created latent image in the copy layer. This latent image was developed and desired changes were made in the copy layer. The copy layer was again exposed to infrared radiation and developed to incorporate the changes on the copy sheet which was then suitable for microfilming.

(11) A layer of polyethylene was exposed in heat-conductive relation with a master to infrared radiations in a Thermo-Fax copying machine set at the fastest speed to form a heat-created latent image in the layer. The image was developed by applying a 1% solution of Oil Red O dye (CI 26125) in hexane to produce a positive dye image. The dye adhered to and permeated the latent image areas of the layer but did not appreciably permeate the non-image areas of the layer. Rubbing appeared to concentrate dye in the latent image areas. Dye left on the non-image areas was easily wiped off.

(12) The exposed layer of polyethylene of Example 11 was developed by applying a dye solution, allowing it to partially dry, and washing with a solvent to remove dye from the non-image areas of the layer without substantially removing dye from the image areas. The contrast between the image areas and the non-image areas was controlled by the selection of the wash solvent. Variables limiting the selection were dye solubility and permeability in polyethylene. Generally the wash solvent required less permeating power into the polyethylene than the dye solvent. Some suitable wash solvents were ethyl alcohol, isopropyl alcohol, xylene, ethylene dichloride, acetone, and a 1 to 1 mixture of carbon tetrachloride and isopropyl alcohol.

One suitable combination was a 1% solution of Oil Red O (CI 26125) in carbon tetrachloride as the dye solution and ethyl alcohol as the wash solvent. Latent images over 8 months old were developed with this combination.

(13) An exposed layer of polyethylene prepared as in Example 11 was developed with 1% solution of Oil Red O dye (CI 26125) in hexane, dried, wiped with a wetting agent such as iso-octyl phenyl polyethoxy ethanol, and rinsed with water to remove dye from the non-image areas of the layer. The use of a toxic or flammable wash solvent was avoided by this method.

Some wetting agents found suitable for the present invention were:

Iso-octyl phenyl polyethoxy ethanol ___ Triton X–100.
Substituted oxazoline _______________ Alkaterge C.
Polyoxyethylene sorbitan monolaurate __ Tween 20.
Condensation polymer of propylene oxide, propylene glycol, and ethylene oxide with molecular weight of about 2,000 ______________________________ Pluronic L 61.
Nonyl phenyl polyethylene glycol ether ________________________________ Tergitol NP 27.
Alkyl aryl polyether alcohol __________ Triton X–155.

(14) The exposed layer of polyethylene of Example 11 was developed by applying a solution of dye in a liquid wetting agent, allowing the solution to remain for a few seconds, and washing with water to remove dye from the non-image areas of the layer without substantially removing dye from the image areas. This method of development completely avoided the use of solvents which were toxic or flammable.

A suitable dye solution was a saturated solution of Oil Red O (CI 26125) in polyoxyethylene sorbitan monolaurate wetting agent such as Tween 20.

(15) A layer of polyethylene coated on glassine paper was placed in heat-conductive relation with a typewritten sheet. The layer was exposed to the sheet by the reflex technique using a No. 5 photographic flashbulb as a source of infrared radiation to form a latent image corresponding to the image on the typewritten sheet. Later, the layer was treated with a 1% solution of Oil Red O (CI 26125) in xylene, dried and then washed with a 1 to 1 mixture of carbon tetrachloride and isopropyl alcohol to develop a clear reproduction of the typewritten sheet.

The sensitivity, retention of latent image, and ease of development provided a simple means for recording secret intelligence which escapes detection until developed. Layers of polyethylene used for commercial wrapping purposes were impressed with latent images for subsequent development.

(16) A heat-created latent image was formed in a layer of polyethylene laminated to a support such as paper. The latent image was then developed by applying a 1% solution of Oil Red O (CI 26125) in xylene, drying, and washing with a 1 to 1 mixture of carbon tetrachloride and isopropyl alcohol. The layer of polyethylene was then de-laminated by soaking in ethyl alcohol and by separating the layer from the support. Both the support and the layer of polyethylene were found to have an image corresponding to the original image.

The image-bearing de-laminated layer of polyethylene was mounted on a transparent support such as cellulose acetate to form a transparency suitable for projection. Using a layer of polyethylene laminated to clear glassine or polyethylene terephthalate film avoided the necessity of de-laminating and remounting the image-bearing layer to obtain a sturdy transparency for projection purposes.

(17) A heat-created latent image was formed in a 5 mil thick layer of plasticized cellulose acetate such as Kodapak I. The latent image was developed by soaking the layer in a 1% solution of Oil Red O (CI 26125) in isopropyl alcohol for about 10 minutes and washing it with clean isopropyl alcohol to produce a red dye image.

(18) Nylon 8 resin such as nylon 819 was coated on paper from a 10% solution prepared according to the following formula:

| | Grams |
|---|---|
| Nylon 8 | 100 |
| Ethyl alcohol | 700 |
| Water | 200 |

The dry coating thickness of the layer was 0.2 to 0.5 mil. A heat-created latent image was formed in the layer of nylon by the reflex exposure technique using a master and infrared radiation. The latent image was developed by applying a solution of dye such as 1% methylene green dye (CI 52020) in water. The dye was preferentially absorbed in the latent image areas to produce a visible image. A 1% solution of Oil Blue A (CI Blue 39) in heptane was also used to develop a latent image in the layer of nylon.

(19) The method of developing by dyeing, drying, and washing according to Example 15 was used for a layer comprising cellulose acetate butyrate coated on a substrate of polyethylene terphthalate. The layer was 0.5 to 1 mil thick. After a heat-created latent image of a typewritten sheet was formed in the layer, it was developed with a solution of Azosol Fast Red BE (CI 12715) in ethyl alcohol. Clean ethyl alcohol was used as the wash solvent. A dye image corresponding to the master image was produced by the preferential penetration of the dye solution into the layer.

(20) A 2% dye solution of Oil Red O (CI 26125) in toluene was applied to a 0.5 mil thick layer of polyethylene coated on supercalendered bleached kraft paper and dried without substantial permeation therein. A heat-created latent image was then formed in the layer by reflex exposure with a master to infrared radiation. The dye was removed from the non-image areas after exposure by rubbing with an abrasive such as steel wool thereby producing a positive copy.

Dye in the non-image areas was also removed by applying a non-penetrating solvent with and without rubbing action to leave a positive image.

(21) A layer of polyethylene having its molecules in a disordered state was first dyed uniformly over one surface by long contact with a penetrating dye solution such as 1% Oil Red O (CI 26125) in xylene and allowed to dry. The dyed layer was then exposed to infrared radiation in heat-conductive relation with a master to form a heat-created latent image. The layer was soaked in a permeating solvent such as heptane, xylene, or carbon tetrachloride to remove the dye in the image areas. The dye in the non-image areas appeared to be substantially fast and was not readily removed. A negative image was produced. By using a 1% solution of Oil Red O (CI 26125) in ethyl alcohol as the dye solution and clean ethyl alcohol as the wash solvent, a positive image was produced. A positive image was produced with a 1% solution of Oil Red O (CI 26125) in hexane as the dye solution and clean hexane as the wash solvent.

(22) A layer of cellulose acetate was dyed uniformly with a mixture of 0.25 gram Blue B Base (of CI 61605 Disperse dye) and 0.5 gram Yellow G Base (of CI 11855 Disperse dye) in a mixture of 60 ml. of acetone and 40 ml. of ethyl alcohol. A heat-created latent image was formed in the layer. The latent image appeared to make the dye become substantive since dye was easily removed from the non-image areas of the layer by soaking in isopropyl alcohol for 10 to 15 minutes but was substantially retained in the image areas to produce a positive green image.

(23) An infrared radiation transparent paper base was coated with a layer of nylon such as terpolymer of nylon 6, nylon 6, 6, and nylon 6, 10 from a 10% solution in a mixture of 20 parts water and 80 parts ethyl alcohol. This layer of nylon was dyed with Oil Red O (CI 26125) in methyl alcohol and after drying, it was exposed in heat-conductive relation with a master to infrared radiation to form a heat-created latent image in the layer. After exposure, the nylon was etched from the image area by a solvent such as ethyl alcohol down to the paper base to form a negative relief image of dyed nylon.

Other dye solutions such as methyl violet base dye (CI Solvent Violet 8) in methyl alcohol were used with the same effect. Dye was also incorporated into the layer of nylon and omitted completely in another modification. Nylon 8 such as nylon 819 was coated in the same manner as above to produce substantially the same results. Diethylene glycol monobutyl ether such as Butyl Carbitol was an excellent etching solvent.

(24) A pencil layer comprising cellulose acetate butyrate and silica was coated on a support of clear polyethylene terephthalate. A heat pattern was applied to the layer to form a heat-created latent image therein. The latent image areas were removed by etching with isopropyl alcohol to uncover the clear support in the image areas, thus forming a relief image.

Other suitable etching solvents were ethyl alcohol, ethylene glycol monoethyl ether, ethyl amyl ketone, amyl acetate, 1,1,1-trichloroethane, diethylene glycol monobutyl ether acetate followed by methyl alcohol, and secondary hexyl acetate.

(25) A layer of low density polyethylene was coated with a thin film of xylene. Before the film evaporated, the layer was placed in contact with a sheet of polyethylene terephthalate with the film of xylene between the layer and the sheet to form a sandwich. This sandwich was used as a copy material in heat-conductive relation with a master for exposure to infrared radiation. After exposure the layer of polyethylene was separated from the sheet of polyethylene terephthalate and the xylene allowed to evaporate. In the layer, an etched image corresponding to the master image was produced, the xylene having permeated and attacked the layer in the heated image areas.

(26) A layer comprising nitrocellulose was coated on a support of polyethylene terephthalate. A heat-created latent image was formed in the layer by exposure with a master to infrared radiation. The layer was etched with ethyl alcohol to remove the latent image areas without substantially affecting the non-image areas. An excellent relief image was produced.

(27) A layer of clear polyethylene was exposed with a master to infrared radiation to form a latent image in the layer. The layer was then coated with a 1% alcoholic solution of 2,5-diethoxy-4-morpholino-1-benzene diazonium chloride, zinc chloride double salt. The solution adhered only to the latent image areas and ran off the background areas. After drying, a solution of 2-phenyl-3-methyl-5-pyrazoline in toluene was applied to the layer and allowed to dry. Exposure of the layer to ammonia vapors allowed the diazonium compound to couple with the pyrazoline to form an intensely colored image corresponding to the master image.

The diazonium compound and the coupler were also coated together on the layer from a solution prepared according to the following formula:

| | Ml. |
|---|---|
| 5% 2,5-diethoxy-4-morpholino-1-benzene diazonium chloride, zinc chloride double salt in ethyl alcohol | 10 |
| 2% citric acid in ethyl alcohol | 10 |
| 2% 1-phenyl-3-methyl-5-pyrazolone in ethyl alcohol | 10 |

This solution adhered only to the latent image areas and did not wet the background areas. After drying, the coated layer was exposed to ammonia vapors which allowed coupling to occur. An intensely colored dye image corresponding to the master image was developed.

(28) A layer of thermoplastic resin was placed in contact with the dye-bearing surface of a dye carrier comprising a cellophane support sheet and Oil Red O dye (CI 26125) coated on the support, the dye being transferable under the influence of heat. The layer-dye carrier sandwich was then placed in heat-conductive relation with a master and the whole assembly exposed to infrared radiation. The formation and transfer of a heat image from the master to the layer and to the dye carrier resulted in formation of a corresponding latent image in the layer and transfer of dye from the carrier to the latent image areas wherein the dye was retained. A positive image was thus formed in the layer and a negative image was formed in the dye carrier.

Suitable thermoplastic resins were polyethylene, cellulose acetate, cellulose acetate butyrate, and polyethylene coated on paper.

(29) A layer of polyethylene bearing a heat-created latent image was treated with a dye solution having the following formula:

| | Grams |
|---|---|
| Ethyl alcohol | 50 |
| Glycerine | 50 |
| Brilliant Oil Blue BMA (CI Solvent Blue 16) | 0.5 |

The dye solution adhered only to the image areas, and upon evaporation of the solvents, a sharply defined image was fixed in the image areas.

A dye-gelatin solution was applied to another layer to develop the latent image. The solution adhered only to the latent image areas and upon drying, a water-wettable dyed gelatin image was formed on the hydrophobic layer of polyethylene. The layer was usable as a printing surface.

Gelatin was dissolved to form the solution according to the following formula:

| | | |
|---|---|---|
| Gelatin | grams | 120 |
| Water | ml | 240 |
| Glacial acetic acid | ml | 1200 |

This gelatin solution was used in the following formula to form the dye-gelatin solution:

| | | |
|---|---|---|
| Gelatin solution | ml | 100 |
| Ethyl alcohol | ml | 300 |
| Acetone | ml | 200 |
| Brilliant Oil Blue BMA (CI Solvent Blue 16) | gram | 1 |

A dye coating comprising gelatin, nitrocellulose, dye and formaldehyde was applied uniformly to a layer bearing a heat-created latent image. The coating was firmly contacted with the pressure-sensitive adhesive tape which was then removed from the coating. Coating in the areas corresponding to the non-image areas was removed from the layer to leave the dye coating intact in the image areas of the layer. The surface adhesion of the layer of polyethylene was evidently greater for the dye coating in the heated image areas than in the unheated non-image areas.

The solution for the dye coating was prepared according to the following formula:

| | | |
|---|---|---|
| Gelatin | lbs | 3 |
| Water | lbs | 6.2 |
| Glacial acetic acid | lbs | 24.8 |
| Acetone | lbs | 47.5 |
| Nitrocellulose | lbs | 2.5 |
| Ethyl alcohol | lbs | 200 |
| Oil Blue BMA (CI Solvent Blue 16) | grams | 333 |
| 37% formaldehyde solution | ml | 1050 |

The gelatin was first dissolved in water and glacial acetic acid. Nitrocellulose was dissolved in the acetone and ethyl alcohol. Both were mixed at 120° F. Blue dye was added. The formaldehyde was added just before coating.

(30) A negative image was produced on a layer of cellulose acetate butyrate supported on polyethylene terephthalate by forming a heat-created latent image in the layer by means of a master and infrared radiation, applying a uniform coating of waterproof drawing ink, drying the coating, and washing the coating with ethyl alcohol. The ink was completely removed from the heated areas but adhered tenaciously to the unheated areas, thereby making a negative image of the master.

(31) A dye carrier sheet was prepared by coating a support of unwaterproofed cellophane with a 1% solution of Oil Red O (CI 26125) in xylene and evaporating the xylene. The dye surface of the carrier sheet was placed in contact with the heat-created latent image bearing surface of a layer of polyethylene to form a temporary sandwich. The sandwich was placed in a hydraulic press and a pressure of about 10,000 pounds per square inch was applied for about 1 minute. Upon separation of the carrier sheet from the layer of polyethylene, a red dye image corresponding to the original image was observed in the polyethylene. A negative image was produced in the dye carrier.

(32) A layer of polyethylene was dyed with a 1% solution of Oil Red O dye (CI 26125) in toluene to form a dye carrier sheet. This was exposed to a heat pattern and placed in contact with an undyed and unexposed layer of polyethylene. Both were subjected to pressure of 10,000 pounds per square inch in a hydraulic press to produce upon separation a negative copy of the heat pattern in the dyed and exposed layer and a positive copy of the heat pattern in the undyed and unexposed layer.

(33) A dye layer comprising Oil Black dye (CI Solvent Black 12) and polyvinyl acetate-chloride copolymer such as Vinylite VYHH was coated on a layer of high density polyethylene extruded onto glassine paper. Exposure with a master to infrared radiation and pressure in a Thermo-Fax Courier copying machine caused the imagewise transfer of dye from the dye layer to the undyed layer. The dye copolymer layer was then stripped from the polyethylene. A positive image was produced in the polyethylene layer.

A solution comprising 1% Oil Red O (CI 26125) and 10% polyvinyl butyral in ethyl alcohol was coated on a layer of high density polyethylene and dried. A thin layer of cellophane was interposed between the dyed layer and the master to form a three layer sandwich. The sandwich was simultaneously exposed to pressure and infrared radiation. After exposure the cellophane layer was stripped from the polyethylene layer together with the dyed layer of polyvinyl butyral which adhered to the cellophane. A dye image was left in the layer of polyethylene.

(34) Mild pressure and exposure were applied simultaneously by passing a dyed layer and an undyed layer together with a master through a copying machine such as a Thermo-Fax Courier copying machine to produce a negative image in the dyed layer and a positive image in the undyed layer. Suitable supports for the dyed layer were cellophane, polyethylene terephthalate, and cellulose acetate. Resins suitable for the positive copy layer were polyethylene, ethyl cellulose, polystyrene, cellulose triacetate, plasticized cellulose acetate, and cellulose acetate butyrate.

Dyes were incorporated into binders for coating on the dye carrier support. One combination was:

| | Grams |
|---|---|
| Paraffin wax | 95 |
| Low molecular weight polyethylene Epolene N–12 | 5 |
| Oil Red O dye (CI 26125) | 1 |

Coated on cellophane, this combination permitted dye to transfer with greater mobility to the undyed layer than the binderless dye carrier sheet.

(35) A layer of plasticized cellulose acetate was dyed with a Blue B base form of CI 61505 Disperse dye and placed against an undyed layer of plasticized cellulose acetate such as Kodapak I to form a sandwich. A heat pattern was transferred imagewise from the dyed layer to the undyed layer to form a positive image in the undyed sheet. The dyed layer was reusable.

(36) A clear copy layer of polyethylene was placed in contact with a silk screen which had a master disposed on the other side. The three layer sandwich was exposed to infrared radiation in a Thermo-Fax copying machine at a rate sufficient to form a diffuse image in the layer. The image-bearing layer was used as a projection transparency. The image was developed to obtain a half-tone copy of the master.

(37) Heat-created latent images in layers of thermoplastic resins were developed by using dry dyes which diffused preferentially into the heated areas and only slightly diffused into the unheated areas. Powdered dry azo and disazo dyes were used on polyethylene to produce positive images.

(38) Heat-created latent images were formed in layers of polyethylene and plasticized cellulose acetate such as Kodapak I by exposing the layer in heat-conductive relation with a suitable master to infrared radiation. When placed between crossed optical polarizers and viewed by transmitted light, the latent images were visible and projectable.

(39) Pencil lines drawn on a layer of nylon coated on a hydrophobic support of polyethylene terephthalate were used to create a latent image in the layer of nylon by exposure of the layer to infrared radiation. The latent image area was etched away by a solvent such as ethyl alcohol to produce a negative relief image which was suitable for a printing plate. The plate accepted greasy ink on the uncovered hydrophobic support in the image areas while water was accepted by the nylon background areas.

(40) A layer of polyethylene was subjected to infrared radiations through a master to produce a heat-created latent image in the layer which was developed with a powder toner applied by rubbing a magnetic brush of toner and iron particles supported by a magnet. A positive image was produced. The toner was fixed by heating in the usual manner.

(41) An unsupported clear layer of polyethylene was placed in contact with a master to form a temporary assembly. This assembly was passed through a Thermo-Fax machine, after which the unsupported polyethylene layer was separated from the master. No visible image appeared on the polyethylene at this point. A powdered toner of the type used in electrophotography was applied to the unsupported polyethylene layer. The toner adhered to the areas corresponding the master image areas in the layer to form a positive copy. The developed image was fixed by heat. One method was to pass the developed layer through the Thermo-Fax machine to cause fixing of the developed image.

(42) A paper coated with resinous thermoplastic nylon 8 such as nylon 819 had a light pencil line image drawn on either or both surfaces thereof. The pencil line image was not of sufficient density to produce a satisfactory copy by the usual reproduction methods. The nylon-coated paper was passed rapidly through a Thermo-Fax machine and a dark-colored powdered thermoplastic toner was applied thereto, the toner being of the type used in electrophotography. The toner adhered to the line image areas on the nylon surface and was fixed to the nylon by heating to soften the toner and adjacent nylon layer to cause permanent adhesion. The lines were thereby sufficiently intensified so that good copies could be made by reproduction processes such as contact printing and microfilming.

(43) Drawings on conventional tracing paper, tracing cloth or drawing paper having infrared transparent bases had pencil line images of insufficient contrast to produce a satisfactory copy by contact printing or by microfilming. The drawings were sprayed with a resinous thermoplastic materal to provide a uniform coating in heat-conductive relation with the pencil images. When the coating was applied to the back of the drawing there was an additional requirement of visual transparency for the base. The drawing was subjected to infrared radiation to produce a heat-created latent image corresponding to the pencil image in the resinous thermoplastic layer. This latent image was developed with a toner powder and fixed by heat. The drawing was then suitable for making copies by the conventional methods. Resins such as those in Example 9 were suitable.

(44) A resinous thermoplastic layer of nylon, cellulose acetate, or polyvinyl butyral having a pigment such as silica dispersed therein for pencil-take was coated on a supporting base such as translucent paper, plastic film or cloth. A copy was made on the pencil-take layer by forming a heat-created latent image therein and developing the heat-created latent image by any of the methods disclosed herein. Changes were then made in the copy by adding pencil lines which were intensified by passing the copy through a Thermo-Fax machine. A heat-created latent image of the pencil line changes was formed. Toner applied to the copy layer adhered to the image areas and was fixed to make the copy suitable for reproduction.

(45) A layer of thermoplastic resin was heated uniformly to at least its second order transition point for several minutes. After cooling, the layer was printed imagewise with coloring matter to produce a permanent graphic image on the layer.

A layer of polyethylene coated on supercalendered bleached kraft paper was heated to 140° F. for several minutes and then allowed to cool. The layer was then printed with 5% Azo Oil Blue Black (CI Solvent Black 12) in toluene to produce a graphic image.

When wiped with heptane the image remained on the layer, whereas the image was wiped off of an unheated layer of polyethylene.

(46) The method of Example 45 was repeated with plasticized nitrocellulose using a 1% solution of Azosol Fast Red BE (CI 12715) in alcohol as the coloring matter to produce permanent images.

(47) Example 45 was repeated with cellulose acetate butyrate and 1% Azosol Fast Red BE (CI 12715) in alcohol to produce permanent images.

(48) Example 45 was repeated with a layer of nylon and a 1% solution of Oil Blue A (CI Solvent Blue 36) in heptane to produce permanent images. A 1% solution of methylene green (CI 52020) dye was also suitable.

(49) Example 45 was repeated using cellulose acetate and a dilute solution of Yellow G Base (CI 61505) to produce permanent images. Rhodamine B (CI 45170) was also suitable.

It is apparent that the described examples are capable of many variations and modifications within the scope of the present invention. All such variations and modifications are to be included within the scope of the present invention.

What is claimed is:

1. A method of obtaining a visible image in a layer of thermoplastic resin comprising the steps of: applying heat imagewise to said layer to produce a heat-created permanent, developable, latent image therein, and placing said layer between crossed optical polarizers to obtain a visible image by transmitted light.

2. A method of making multicolor images on a layer of polyethylene comprising the steps of: contacting said layer with the dyed surface of a dye-transfer sheet to form a sandwich; applying heat imagewise to said sandwich to produce a permanent, developable, latent image corresponding to the heat image in said layer and to simultaneously transfer dye to said latent image; and repeating the steps in registration using different colored dye-transfer sheets with different heat images to produce a multicolor image on said layer.

3. A method of intensifying graphic intelligence on a master comprising a support transparent to infrared radiation and infrared radiation absorbing marking material disposed imagewise on said support, said method comprising the steps of: exposing a layer of thermoplastic resin provided in heat-conductive relation to said master to infrared radiation to form a heat-created permanent, developable latent image in said layer; and treating said layer with a developing agent which adheres selectively to said layer to render visible said latent image, thereby intensifying said master image.

4. A method of making a relief image suitable for printing purposes in a supported layer of thermoplastic resin comprising the steps of: heating said supported layer imagewise to form a heat-created permanent, developable, latent image therein; and treating said layer with a solvent which selectively removes the image portions of said layer to expose the support thereunder, thereby producing a relief image.

5. A method of making a diazo copy on a layer of thermoplastic resin comprising the steps of: forming a heat-created permanent, developable, latent image on said layer; applying to said layer a diazo compound and coupler in a solution which selectively adheres to said layer; and developing the layer with ammonia to produce a visible diazo copy.

6. A method of making a copy on a layer of thermoplastic resin comprising the steps of: providing said layer in heat-conductive relation to a dye coating on a dye carrier sheet to form a sandwich; placing the sandwich in heat-conductive relation with a master having infrared radiation absorbing image areas thereon; and subjecting the master and the sandwich to infrared radition to simultaneously form a heat-created permanent, developable, latent image in said layer and to cause imagewise transfer of dye from the dye carrier sheet to said layer, thereby forming a copy of the master image on said layer.

7. A method of making a printing plate on a layer of polyethylene comprising the steps of: forming a heat-created permanent, developable, latent image in said layer by the imagewise application of heat; coating said layer with a solution comprising gelatin which adheres selectively to said layer to develop said latent image; and drying said layer.

8. A method of producing an image on a layer of unoriented polyethylene comprising the steps of: forming a heat-created permanent, developable, latent image in said layer by the imagewise application of heat; forming a sandwich with said layer contacting the dye coating side of a dye carrier sheet; and applying pressure to said sandwich to cause transfer of the dye from the dye carrier sheet to the latent image areas of said layer to form a positive image in said layer.

9. A method of making an image on a layer of thermoplastic resin comprising the steps of: applying a coating of binder and dye to said layer; exposing said coated layer with a master to infrared radiation and pressure to simultaneously form a heat-created permanent, developable, latent image in said layer and to cause the imagewise transfer of dye from the coating to said layer; and stripping said coating from said layer to leave a positive image in said layer.

10. A method of making a half-tone copy on a layer of thermoplastic resin comprising the steps of: placing a fine silk screen in contact with a layer of thermoplastic resin; placing a master in contact with the other side of the sandwich to infrared radiation to form a heat-created permanent, developable latent image in said layer; and developing said latent image to produce a halftone copy of the master.

11. A method of making a printing plate on a supported layer of thermoplastic resin comprising the steps of: drawing pencil lines on said layer; exposing said layer to infrared radiation to form in said layer a heat-created permanent, developable, latent image corresponding to the pencil line image; and treating said layer with a solvent which selectively etches out the latent image areas to produce a relief image suitable for printing purposes.

12. A method of making intensified changes in graphic intelligence during the process of making a copy on a pencil-accepting layer of thermoplastic resin from a master, said method comprising the steps of: placing the master in contact with said layer; covering unwanted portions of the master with a metal foil; subjecting the superposed master, metal foil, and said layer to infrared radiation to produce a heat-created permanent, developable, latent image of the uncovered portions of the master in said layer; developing the latent image in said layer; making the desired changes on said layer with a pencil; subjecting said layer with the changes to infrared radiation to produce an additional permanent, developable, latent image; and developing said layer, thereby producing a copy with intensified changes in graphic intelligence.

13. A method of printing a permanent image on a layer of thermoplastic resin comprising the steps of: heating said layer uniformly to at least the second order transition point of said resin and applying a solution of coloring matter imagewise to said layer to produce upon drying a permanent image thereon, said coloring matter being selected from the group consisting of Oil Red O (CI 26125), Oil Brown M (CI Solvent Brown 21), Plasto Blue RDA (CI Solvent Blue 16), Plasto Violet MR (CI Solvent Violet 17), Oil Blue A (CI Solvent Blue 36), Calcozine Violet (CI 42535), Methyl Violet Base (CI 42535 B), Oil Brown Y (CI 20020), Quinizarine Green Base (CI 61565), Brilliant Oil Blue BMA (CI Solvent Blue 16), Azo Oil Blue Black (CI Solvent Black 12), Brilliant Oil Scarlet 6G (CI Solvent Orange 7), Azo Oil Black (CI Solvent Black 12), Oil Red EGN (CI 26120), Azosol Fast Red BE (CI 12715), Blue B Base (CI 61505), Yellow G Base (CI 11855), Rhodamine B (CI 45170), Oil Red (CI Solvent Red 24), Oil Red RO (CI Solvent Red 63) and Methylene Green (CI 52020).

14. A method of printing permanent multicolor images on a layer of thermoplastic resin comprising the steps of: heating said layer uniformly to at least the second order transition point of said resin to produce a permanent, developable, latent change therein; applying a first solution of coloring matter imagewise to said layer to produce upon drying a permanent image thereon; and repeating the applying step with different colored coloring matter to produce a multicolor image on said layer.

15. A method of making a visible image, which comprises the steps of:
applying heat imagewise to a layer of thermoplastic resin to form a permanent, developable, latent image therein; and
rendering the permanent, developable, latent image visible by effecting a visual contrast between said image and non-image portions.

16. A method in accordance with claim 15 wherein said latent image is rendered visible by applying coloring matter which selectively colors one of the image and non-image portions of said layer to form a reproduction of the heat image.

17. A method in accordance with claim 15 wherein said latent image is rendered visible by using a developing means selected from the group consisting of dye solutions, dye carrier sheets, dye powders, etching solvents, abrasives, crossed optical polarizers, selective wetting solutions, dye receiving sheets, color-forming solutions, and selective wash solvents.

18. A method of making a reproduction on a layer of thermoplastic resin, which comprises the steps of:
forming a permanent developable, latent image in said layer by exposing a master provided in heat-conductive relation with said layer to infrared radiation to form a heat-created, permanent, developable, latent image therein; and
developing said latent image by applying coloring matter which selectively colors one of the image and non-image portions of said layer to form a reproduction of the master.

19. A method in accordance with claim 18 wherein developing said latent image comprises applying dye to the layer, and removing the dye from the non-image portions, thereby obtaining a reproduction of the master.

20. A method of making an image on a layer of thermoplastic resin, which comprises the steps of:
providing a uniformly colored layer of thermoplastic resin;
forming a permanent, developable, latent image in said layer by the image-wise application of heat; and
effecting a visual contrast between said image and non-image portions.

21. A method in accordance with claim 20 wherein said uniformly colored layer is provided by dying said layer uniformly with a solution of dye, and said visual contrast is effected by removing dye from one of the image and non-image portions.

22. A method of forming a permanent image in a layer of thermoplastic resin, which comprises the steps of:
heating a layer of thermoplastic resin flamelessly to produce a permanent, developable, latent change therein; and
applying coloring matter imagewise to said layer to produce an image therein.

23. A method in accordance with claim 22 wherein said heating of the thermoplastic resin is to at least the second order transition point, and said resin is selected from the group consisting of polyethylene, nylon, cellulose acetate butyrate, cellulose acetate, and plasticized nitrocellulose.

24. A method in accordance with claim 22 wherein the heating of the thermoplastic layer forms a permanent, developable, latent change throughout said layer whereby both surfaces of said layer become colorable; and wherein the step of applying coloring matter comprises applying coloring matter imagewise to at least one of said surfaces of said layer to form an image.

References Cited by the Examiner
UNITED STATES PATENTS

| | | | |
|---|---|---|---|
| 2,859,351 | 11/58 | Clark et al. | 250—65 |
| 2,880,110 | 3/59 | Miller | 250—65 |
| 2,929,736 | 3/60 | Miller | 250—65 |
| 2,954,311 | 9/60 | Weel | 250—65 |
| 3,054,692 | 9/62 | Newman et al. | 250—65 |
| 3,060,020 | 10/62 | Greig | 117—17.5 |
| 3,060,052 | 10/62 | Martin | 117—17.5 |
| 3,094,417 | 6/63 | Workman | 250—65 |
| 3,100,702 | 8/63 | Rauner | 250—65 X |
| 3,108,896 | 10/63 | Owen | 250—65 |
| 3,120,611 | 2/64 | Lind | 250—65 |

RALPH G. NILSON, *Primary Examiner*.

UNITED STATES PATENT OFFICE
CERTIFICATE OF CORRECTION

Patent No. 3,206,601                         September 14, 1965

Robert M. Gold

It is hereby certified that error appears in the above numbered patent requiring correction and that the said Letters Patent should read as corrected below.

Column 3, line 35, for "of" read -- to --; column 4, line 27, for "absodption" read -- absorption --; column 12, line 43, after "pattern" insert -- was applied to the sandwich. Dye --; column 14, line 73, for "radition" read -- radiation --; column 15, line 32, after "the" insert -- screen to form a three layer sandwich; subjecting the --.

Signed and sealed this 27th day of December 1966.

(SEAL)
Attest:

ERNEST W. SWIDER                         EDWARD J. BRENNER
Attesting Officer                            Commissioner of Patents

Notice of Adverse Decision in Interference

In Interference No. 95,551 involving Patent No. 3,206,601, R. M. Gold, PLASTIC FILM THERMOGRAPHY, final judgment adverse to the patentee was rendered Oct. 6, 1969, as to claim 24.

[*Official Gazette March 17, 1970.*]